May 2, 1950 M. L. JACOBS 2,505,969
APPARATUS FOR FIXING BLADE ANGULATION OF
WIND-DRIVEN MULTIBLADE PROPELLERS
Filed Nov. 25, 1946 2 Sheets-Sheet 2
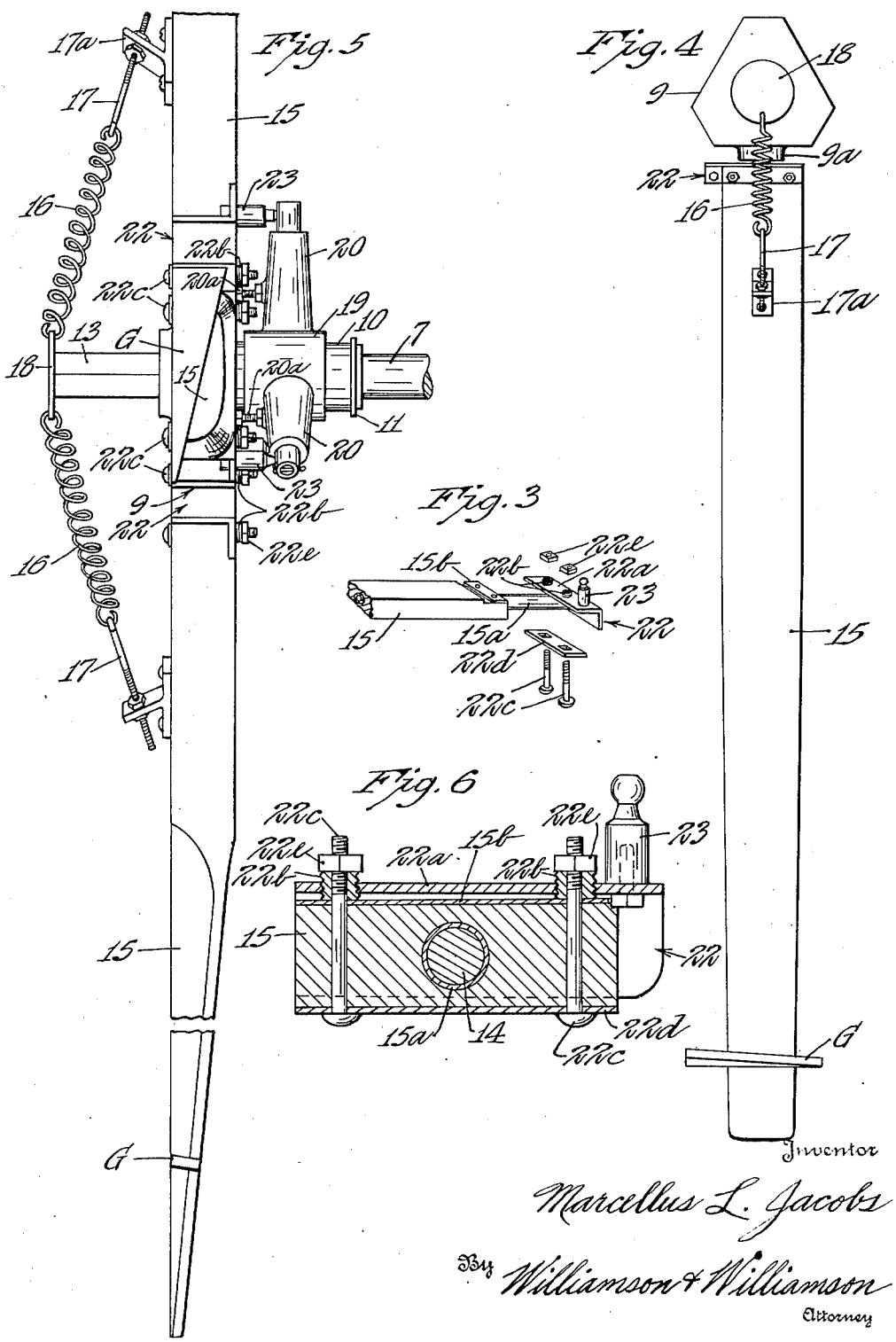
Inventor
Marcellus L. Jacobs
By Williamson & Williamson
Attorney

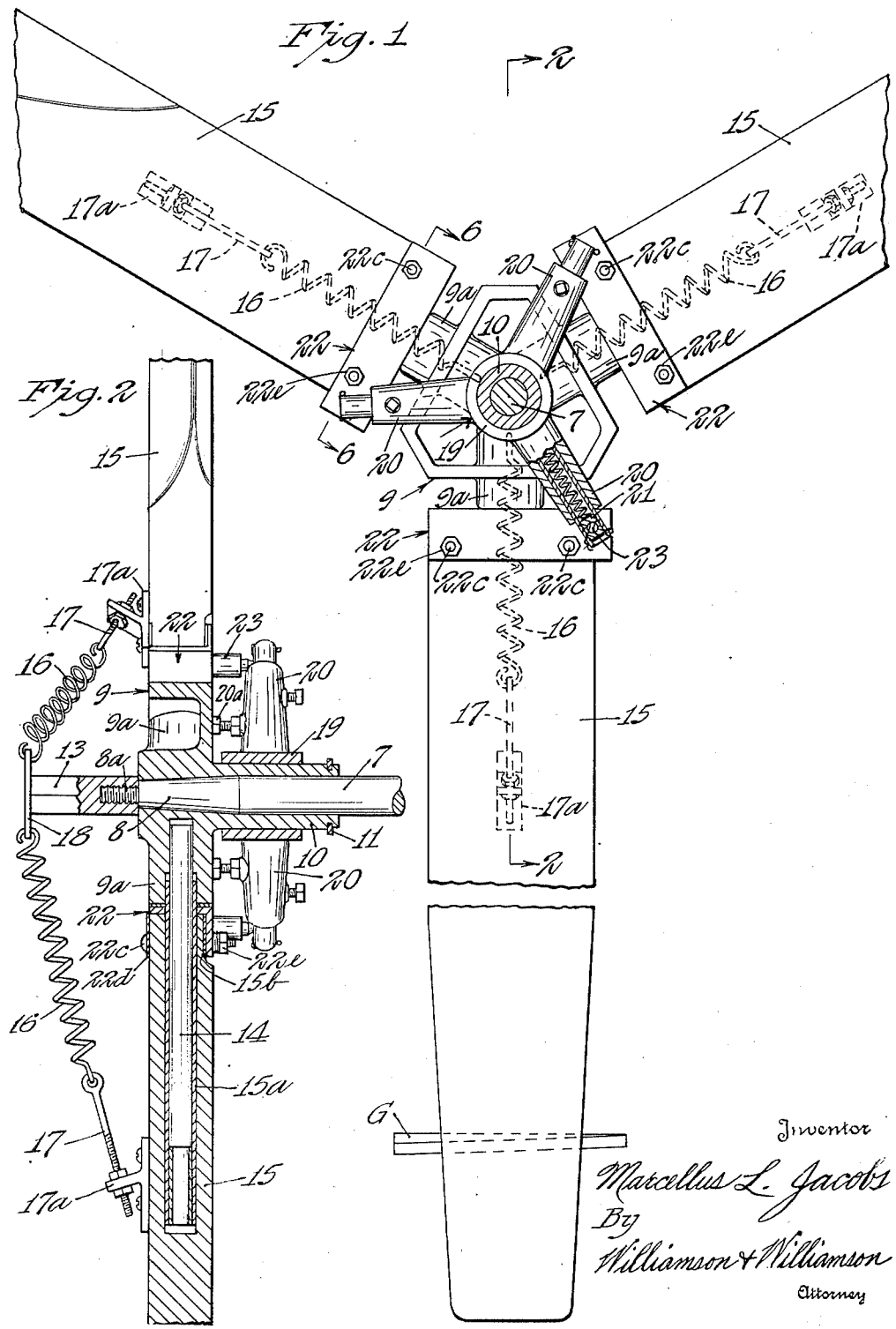

UNITED STATES PATENT OFFICE 2,505,969

APPARATUS FOR FIXING BLADE ANGULATION OF WIND-DRIVEN MULTIBLADE PROPELLERS

Marcellus L. Jacobs, Minneapolis, Minn.

Application November 25, 1946, Serial No. 712,164

6 Claims. (Cl. 170—68)

This invention relates to multi-blade, variable pitch, wind-driven propellers such as are used in wind electric plants and the like.

In most wind electric generators, the two or three blades utilized in the propeller, are of the variable pitch, aerofoil principle mounted upon the driven rotary member or hub for governed and synchronized, angular variation with reference to the general plane of the face of the propeller.

In wind-driven propellers, the governing mechanism for varying the angulation or pitch of the several blades thereof in accordance with the requirements of wind velocity and propeller speed, is usually responsive to centrifugal force rather than change in pressure or density of the air in which the propeller is operated, for the following reasons:

In the first place, average wind velocities available are low (approximating 10 miles per hour) and consequently, the propeller must be designed for relatively low R. P. M. with highest efficiency in the neighborhood of 200 R. P. M.

In the second place, during part of the time, the propeller is not subjected to load. For example, in a wind electric plant, to prevent overcharging of the batteries, reduction in the load on the generator is essential and may only be obtained if the speed of the generator is maintained within reasonably close limits. Such maintenance is impossible for practical commercial use with governing mechanism which is dependent upon variance of air pressures or velocities.

An example of an efficient centrifugally operated blade-angling or feathering device for wind-driven propellers, is disclosed in Patent No. 2,464,234 issued March 15, 1949.

In view of the efficiency and narrow range of R. P. M. speed required in wind-driven propellers, it is highly important that the several blades be mounted and at all times, maintained at similar pitch and connected for efficient synchronization in feathering or changing of angulation to the general plane of the face of the propeller.

It is an object of my present invention to provide efficient apparatus and method by which, in installation, correct and similar setting of the several blades may be assured and by which subsequent correction for warping or slight displacement of one or more of the several blades, may be effected with facility.

More specifically, it is an object to provide blade-attachment means for securing the butt ends of the blades to the driven rotary element with provision for ready adjustment of the blade-seating surfaces to make correction as needed in the set pitch of the outer portions or tip portions of the several blades.

Another object is the provision of a simple but efficient method whereby the pitch of the several blades may be individually set to a predetermined, required pitch and determination thereof made through gauging means.

These and other objects and advantages of my invention will be more apparent from the following description made in connection with the accompanying drawings, wherein like reference characters refer to similar parts throughout the several views and in which:

Fig. 1 is a rear elevation illustrating a type of variable pitch, wind-driven propeller utilizing my improved apparatus, and wherein portions of the blades are broken away.

Fig. 2 is a vertical section taken approximately on the line 2—2 of Fig. 1.

Fig. 3 is an exploded perspective view showing the essential elements of my adjustable blade-mounting apparatus.

Fig. 4 is a fragmentary, front elevation showing the attachment of one of the blades to the hub and illustrating the gauging step of my method.

Fig. 5 is a side elevation with a portion of one of the blades broken away showing my method of determining a correct setting of the horizontally disposed blade through sighting upon a gauge block; and Fig. 6 is a detail cross section taken on the line 6—6 of Fig. 1.

In the form of wind electric propeller illustrated, a horizontal propeller shaft 7 is provided having a tapered outer end 8 upon which is secured a substantially triangular hub unit indicated generally as 9. The hub unit 9 has a rearwardly extending, integrally formed sleeve portion 10 provided at its rear end with an outturned abutment flange 11. The forward end of propeller shaft 7 is reduced and threaded at 8a to receive an outwardly and axially extending post member 13, the latter acting as a nut to clamp and retain the hub unit upon the tapered portion 8 of the shaft. As shown in Fig. 1, the hub unit 9 is in the form of a spider, has a forward, vertical face lying in a vertical plane and includes radiating socket portions 9a which are integrally formed or rigidly connected with the generally triangular periphery of the hub unit.

Extending outwardly from the three socket portions 9a and extending radially of the hub unit 9, are fixed heavy rods 14 upon which are slidably and revolubly mounted, variable pitch propeller blades 15, said blades being longitudinally socketed along their longitudinal center lines and being provided with bearing sleeves 15a which surround the radial rods 14.

Connected to the front face of each of the blades 15, is a coil tension spring 16, the connection being in the form of an adjustable anchor bolt 17, adjustably secured to an angle bracket 17a fixed to the front face of the blade and extending along the longitudinal center line of the blade. The spring 16 for the several blades, extend radially inwardly from their anchor bolts 17 and are secured in radially spaced relation to an equalizing plate 18 which lies against the outer end of post 13. Equalizing plate 18 is not in any way secured to the extended member or post 13 of the propeller.

Mounted upon the rear sleeve extension 10 of the hub unit is a collar 19 which is provided with a plurality of rigidly connected, short radial arms 20 equal in number to the blades of the propeller and extending when the blades are disposed with their forward faces substantially flush with the general plane of the propeller face, at acute angles to the longitudinal center lines of the blades and disposed in a counterclockwise direction from said longitudinal center line when the propeller is viewed in rear elevation, as shown in Fig. 1.

A spring socket, generally indicated as 21, is mounted in the end of each of the arms 20 directed generally laterally of the respective arm and towards the associated blade butt.

The butt ends of the respective blades are each adjustably fixed to an angle mounting bracket indicated generally by the numeral 22, which constitutes an important part of my present invention. Each of the mounting brackets 22 has fixed thereto, in predetermined relation, a rearwardly and horizontally extending stud 23 terminating, as shown, in a ball-connector member which is received in the spring ball socket 21 of the associated short arm 20.

The tension springs 16 which are connected to the blades 15 and at their inner ends, to the equalizing plate 18 at the center of the unit, maintain the several blades at their normal working angle and urge said blades longitudinally and inwardly towards the hub unit 9. They do this in conjunction with the synchronized linkage for each blade comprising the collar 19 mounted for oscillation and longitudinal movement upon sleeve portion 10 of the hub, and comprising the radial arms 20 extended from said collar and the studs 23 which are fixedly connected to the rear faces of the blades.

When the apparatus attains sufficient speed and produces accompanying predetermined, centrifugal force, the blades will tend to move outwardly on the fixed mounting posts or rods 14 against the tension of springs 16 and consequently, a pull radially of the unit, will be exerted upon the several studs 23, short arms 20 and collar 19. The blades will thus be made to twist because of the said linkage and said linkage and collar 19 will be made to move rearwardly, said collar twisting and sliding rearwardly on the sleeve extension 10 of the hub unit. Because of this linkage, all of the blades will twist or feather to the same degree. The said outward movement of the blades radially of the propeller, is limited by abutment of the collar 19 with the abutment flange 11 at the rear end of the sleeve portion 10 of the hub.

Efficient means are provided for adjustably limiting the inward movement of the collar 19 and the blade feathering arms 20 carried thereby. As shown, this means comprises for each of the radial feathering arms 20 an adjustable abutment bolt 20a screw threaded in a suitable threaded boss extending laterally towards the hub 9 of the structure. The heads of the adjustment bolts 20a are adapted to simultaneously engage against the flat vertical face of the rotor hub 9 and may be individually adjusted to eliminate binding of the collar in its extreme inward movement.

Referring now in detail to my adjustable blade mounting bracket 22 (see particularly Figures 2, 3, 4 and 6) I provide for each blade a short angle bar 22a which is transversely and rigidly affixed as by welding to the inner end of the associated blade bearing sleeve 15a, the vertical web of said angle bar being disposed substantially flush with the rear and inner face of the hub structure 9. The butt of the associated blade 15, as shown, is rabbeted at its inner face and provided with a transverse medial bearing plate 15b. The butt extremity of the blade is adapted to be abutted and seated against the angle flange of angle plate 22a. While the bearing plate 15b engages against a pair of adjustable spacing sleeves or bushings 22b which extend normal to the inner and vertical webs of the angle bars. Spacing sleeves 22b are adjustably projectible through the flange of angle plate 22a, being externally threaded in tapped recesses formed in said flange. The inner ends of said spacing sleeves are adapted to abut against the bearing plate 15b fixed to one face of the blade butt and by adjustment in the projected inner end of the two externally threaded sleeves, one of the longitudinal edges of the blade may be secured at the butt portion to the hub in much closer spaced relation than the other longitudinal edge. Thus, a variance in the pitch of the blade, within of course, a predetermined range, may be accurately obtained through what constitutes a micrometer adjustment. In the embodiment of the invention shown, the adjustable spacing sleeves 22b also have a cooperating function in the clamping attachment of the blades to flange 22a. To this end, clamping bolts 22c threaded at their outer ends, extend through the spacing sleeves 22b as well as through bearing plate 15b and preferably, a clamping plate 22d affixed to the opposite face of the butt from the bearing plate 15b. Nuts 23a threadedly engage the ends of the bolt and are adapted to be clamped against the outer extremities of the sleeves 22b.

In assembling the blades 15 and setting them properly for pitch the elongated rod receives bushings 15a with the angle plate 22a rigidly attached thereto and is telescoped into the blade as shown in Figure 3, and the clamping bolts 22c are then applied and thereafter adjustment of the threaded sleeves 22b may be made to obtain the desired pitch of each propeller blade. From inspection of Figure 6 it will be noted that the inner ends of the adjustment sleeves 22b abut against the bearing plate 15b at the inner side of the butt of the blade determining its seating and, of course, the pitch thereof within a certain range and in accordance with the relative adjustments of the two threaded sleeves 22b.

To accurately determine the proper seating of each blade in uniformity I provide a simple method closely woven with the construction of my blade attachment mechanism, whereby accurate results may be obtained both in the original installation and in correcting warping or other slight displacement of the blades after considerable use. To this end a wedge shaped gauge bar G is utilized preferably applied transversely across the blades near the tip extremities thereof (for example at a distance of approximately six inches inwardly of the tip extremities). The gauge block G is angulated to conform at its forward face to the plane of the forward face of the hub structure 9 when the blade is properly seated and secured in its ordinary or normal position for receiving a very light wind. To determine the adjustment of the threaded sleeves 22b and to accurately gauge correct setting one of the gauge blocks G is disposed transversely of the tip of a blade as illustrated in Figures 4 and 5, and a sight is then taken by a person making the installation across the outer face of the gauge block and across the outer face of the hub structure 9. This is done when the collar 19 and linkage connected therewith including the arms 20 and connection stubs are in the extreme "plate flattened" position urged by the cooperating coil springs 16 as shown in the drawings. When through sighting over the gauge plate the rear face thereof appears to be in perfect alignment with the plane of the vertical rear face of the hub then that blade is properly adjusted to conformity. Successively the several blades may be adjusted and clamped in their respective brackets 22 in the manner described. When the alignment is not perfect one or both of the short adjustment sleeves or bushings 22a are threadedly adjusted as is required.

After continued use of the wind driven propeller one or more of the blades often become slightly warped or skewed from their original set positions particularly in their outer or tip portions thereof. The pitch at the outer end of the blade is, of course, much more important than precise and uniform regulation of the butt portions of the blades since the rate of revolution of the tips is much greater than at the central portion of the propeller. For this reason the gauge blocks G are used at the outer portions of the blades to accurately set the blades for uniformity of pitch.

From the foregoing description it will be seen that I have provided simple but highly accurate mechanism and apparatus for uniformly setting the several blades of a wind driven propeller at the time of installation and for readily correcting for slight displacement or warping of one or more of the blades after the device has been in use for some time. It will further be seen that I have provided a simple method for indicating inaccuracies in the respective settings of a plurality of propeller blades which enables the blade settings to be readily corrected and to be brought into uniformity with the predetermined angulations required.

It will, of course, be understood that various changes may be made in the form, details, arrangement and proportions of the various parts without departing from the scope of my invention.

What I claim is:

1. Adjustable blade-attachment mechanism for providing correct setting of the several blades of a wind-driven propeller having a hub provided with a plurality of radial blade-pivoting elements, extending therefrom, said mechanism comprising for each blade, a mounting member slidably carried by one of said blade-pivoting elements of the propeller and having a portion adapted to be disposed over one face of the butt of the associated propeller blade and having an adjustable spacing element mounted in said portion and projectable therefrom towards said butt, said spacing element being disposed to one side of the longitudinal center line of the associated blade and means for securing the butt of each blade to its respective mounting member with the adjustment of said elements determining the individual settings of said blades.

2. Adjustable blade-attachment mechanism for providing correct setting of the several blades of a wind-driven propeller having a hub provided with a plurality of radial blade-pivoting elements, extending therefrom, said mechanism comprising for each blade, a mounting bracket slidably carried by one of said blade-pivoting elements of the propeller, said mounting bracket having a flange adapted to be disposed over one face of the butt of the associated blade and having a pair of independently adjustable spacing elements threadedly mounted in said flange and projectible against said face of the butt and circumferentially spaced with reference to said propeller and disposed at opposite sides of the longitudinal center line of the attached blade and means for securing the butt of each blade to its respective mounting bracket with the adjustment of said elements determining the individual setting of each blade.

3. The structure set forth in claim 2 and said adjustable spacing elements being annular and defining passages for accommodation of said butt-securing means.

4. In combination with a multi-blade propeller having a rotary hub and a series of substantially radial blades connected with said hub by pivot shafts for varied angulation on axes extending substantially radially of said hub, a collar rotatably and slidably mounted on said hub coaxially thereof, a mounting bracket for receiving the butt of each of said blades and for adjustably connecting said blades with said one of said pivot shafts, governing link connections between said brackets and said collar for variably angulating said brackets according to the speed of said propeller, said mounting brackets each having at least one adjustable spacing element connected therewith adapted to bear against one face of the butt of the associated blade at a point to one side of the longitudinal axis of said blade and means for rigidly securing the butt of each blade to its respective mounting bracket with the adjustment of said spacing element determining the individual setting of the associated blade.

5. The structure set forth in claim 4 and said spacing element being of annular form threadedly connected with its associated bracket and said butt-securing means including an attachment element extending through the butt and said annular spacing element for securing the blade to the associated bracket.

6. The structure set forth in claim 4, said governing link connections including a collar slidably mounted upon said hub and a plurality of circumferentially spaced adjustable abutment elements connected with said collar and adapted to engage a portion of said hub to limit longitudinal movement of said collar relative to said hub in one direction to regulate said governing link connections and prevent binding of said collar upon said hub.

MARCELLUS L. JACOBS.

REFERENCES CITED

The following references are of record in the file of this patent:

UNITED STATES PATENTS

| Number | Name | Date |
|---|---|---|
| 114,381 | Woodruff | May 2, 1871 |
| 1,163,010 | Hirth | Dec. 7, 1915 |
| 1,834,350 | Schroeder | Dec. 1, 1931 |
| 1,875,998 | Everts | Sept. 6, 1932 |
| 2,050,142 | White | Aug. 4, 1936 |
| 2,052,454 | Ellwood et al. | Aug. 25, 1936 |
| 2,117,788 | Cable | May 17, 1938 |
| 2,464,234 | Jacobs | Mar. 15, 1949 |